May 30, 1967

J. B. LYMAN 3,322,282

FILTERING APPARATUS

Filed March 6, 1963

Inventor:
John B. Lyman
By: Hofgren, Wegner, Allen,
Stellman & McCord
Attorneys

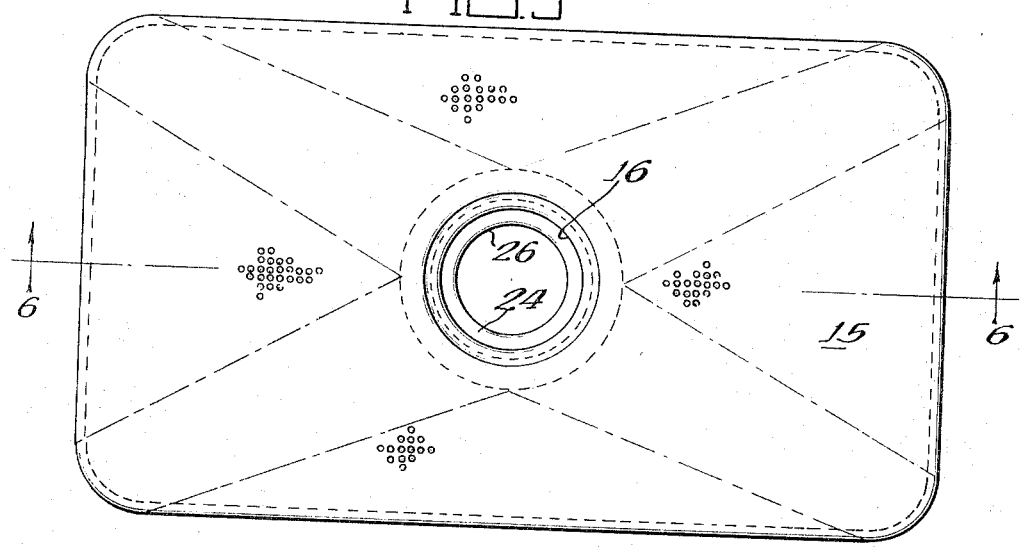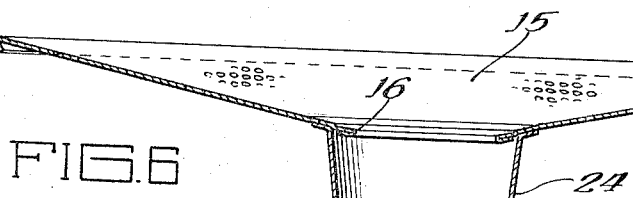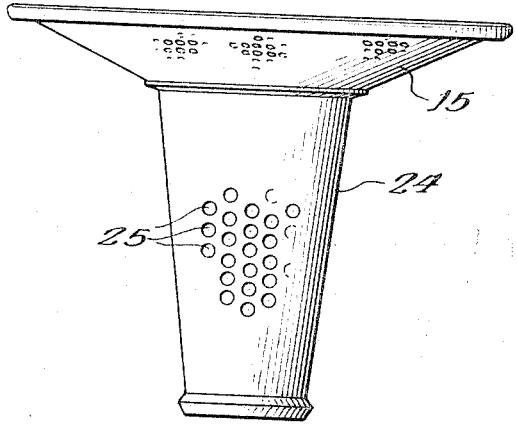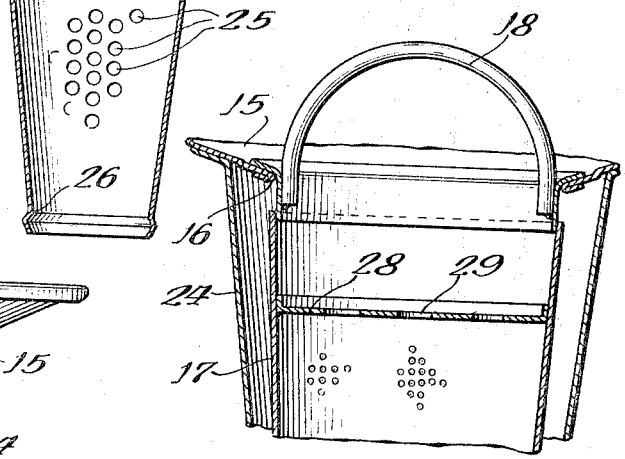

United States Patent Office 3,322,282
Patented May 30, 1967

3,322,282
FILTERING APPARATUS
John B. Lyman, Minneapolis, Minn., assignor to Whirlpool Corporation, a corporation of Delaware
Filed Mar. 6, 1963, Ser. No. 263,241
3 Claims. (Cl. 210—137)

This invention relates to a filtering apparatus for removing entrained solids from a liquid.

The filtering apparatus of this invention is particularly applicable to mechanical dishwashers in which a washing fluid is circulated in a closed path over the dishes and the like to be washed to remove solids such as food residue from the dishes. The filtering apparatus of this invention permits ready removal of the entrained solids from the washing and rinsing fluids and provides means for disposing of the solids through a drain or the like.

One of the features of this invention is to provide a filtering apparatus having means forming a fluid path for carrying entrained solids together with filter means in this path having filter openings for intercepting the solids and pressure drop means adjacent the filter means to reduce the fluid pressure drop through the filter to prevent the fluid excessively wedging the solids into the openings in the filter means.

Other features and advantages of the invention will be apparent from the following description of one embodiment thereof as shown in the accompanying drawings. Of the drawings:

FIGURE 5 is a plan view of a portion of the dishwasher as illustrated in FIGURE 2.

FIGURE 6 is a sectional elevational view taken substantially along line 6—6 of FIGURE 5.

FIGURE 7 is an end elevational view of the apparatus of FIGURE 5.

FIGURE 8 is a detail sectional elevational view of a portion of the apparatus of this invention.

Figure 1:
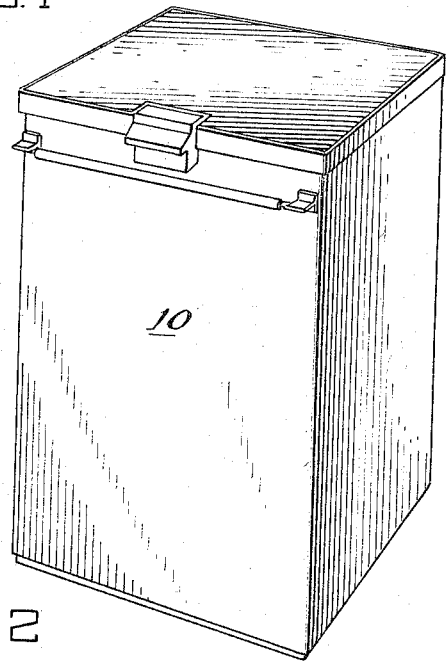
FIGURE 1 is a perspective view of a dishwasher embodying the invention.
Figure 3:
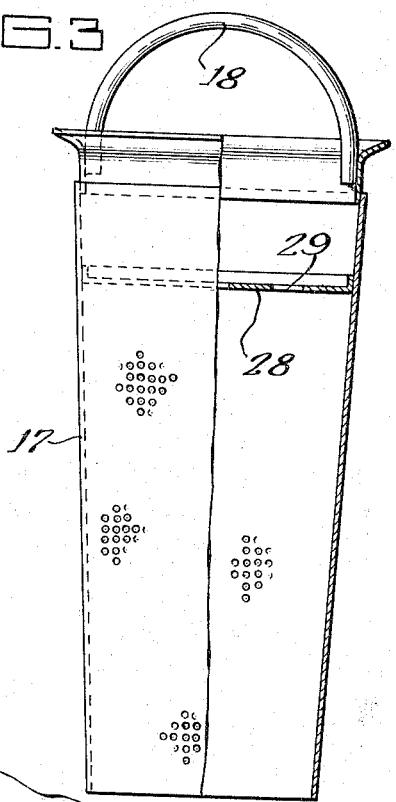
FIGURE 3 is a detail side elevational view partially broken away of one part of the dishwasher.
Figure 2:
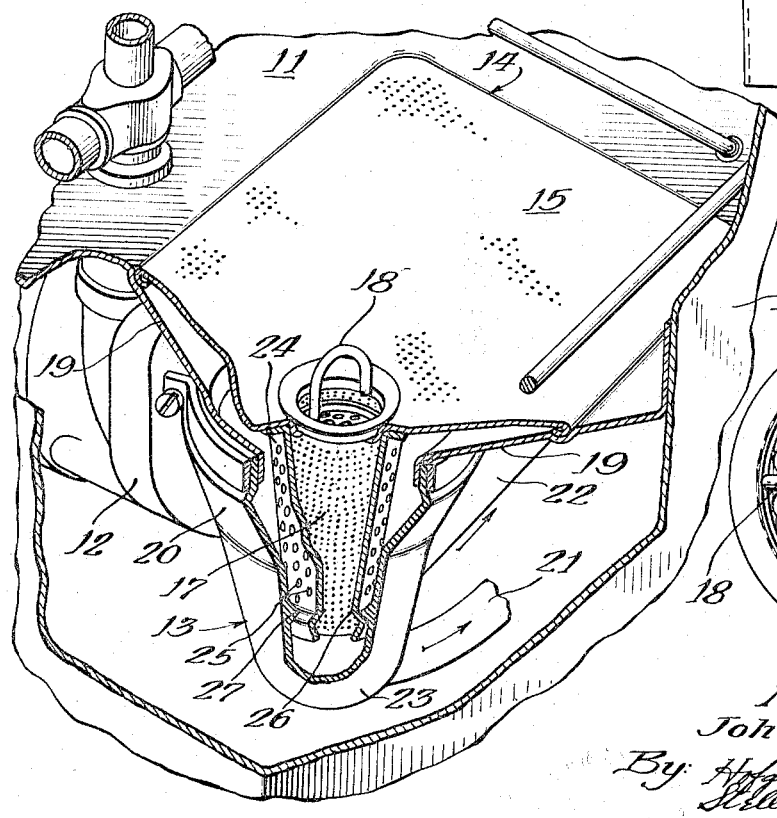
FIGURE 2 is a fragmentary perspective view partially broken away showing a portion of the dishwasher embodying the invention.
Figure 4:
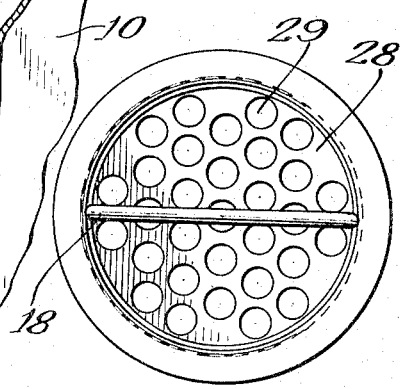
FIGURE 4 is a plan view of the dishwasher part of FIGURE 3.

The filtering apparatus of this invention is illustrated in the drawings as forming a part of a mechanical dishwasher in which washing liquid is forcefully circulated over the dishes to remove food residue followed by rinsing and drying with all these functions controlled in timed sequence.

In the illustrated embodiment the dishwasher comprises a casing 10 containing a tub 11 in which the dishes are held for washing and rinsing. The washing liquid and the rinsing liquid are each circulated through the dishwasher by means of a liquid pump 12 of the customary type operating in the customary manner.

A portion of this path is defined by a liquid sump 13 which contains the filtering apparatus 14 embodying the invention.

The filtering apparatus comprises a preliminary separating means 15 in the form of a foraminous screen of shallow dish shape with the upper surface thereof being the separating surface for preliminary separating liquid entrained solids. This preliminary separating means or screen 15 has an opening 16 at about its center or lowest point. Extending downwardly from this opening 16 is a filter means 17 in the form of a tubular filtering screen that is shaped as an inverted truncated cone with a larger diameter at the top than at the bottom. This tubular screen 17 is removable from the opening by means of an upwardly extending handle 18. Beneath this handle is a coarse screen 28 containing ¼-inch holes 29.

The sump 13 is formed by a depending dish shaped portion 19 of the tub 11 beneath the screen 15 which is sealingly joined to the top of a rubber receiver 20 that surrounds the tubular screen 17 and the portion of the screen 15 adjacent thereto. This receiver 20 is provided with one tubular conduit 21 that communicates with a sewer or other place of disposal and a second tubular conduit 22 which is a part of the recirculation system for the liquids. The first conduit 21 communicates with a bottom section 23 of the rubber receiver 20 beneath the tubular screen 17 which communicates therewith through the open bottom of the screen 17. The section 23 serves as a solids receiving means to receive solids from the filters.

Surrounding the tubular screen 17 and spaced outwardly therefrom a fraction of an inch is a tubular barrier member 24 of rigid sheet material provided with spaced openings 25 of larger diameter than the holes 30 in tubular screen 17. The openings 25 occupy from about 8% to about 20% of the entire surface of the member 24 so that the member 24 operates as a pressure drop means adjacent the filter means 17 to reduce the fluid flow through the filter means in order to prevent the fluid from excessively wedging solids into the openings 30 in the tubular screen 17. The barrier member 24 thus is downstream from the filter means 17 thereby restricting fluid flow in a region upstream from the barrier member that includes the filter means so that the fluid will flow relatively slowly through the tubular screen 17 to prevent or substantially reduce the tight wedging of solid particles into the openings of filter means 17.

As can be seen from the drawings the bottom of the barrier member 24 is substantially sealed to the bottom of the tubular screen 17 at 26. Similarly, the bottom of the barrier member 24 is sealed at its bottom to the rubber receiver 20 at the inwardly extending annular ridge 27 of the rubber receiver. With this arrangement, the barrier member 24 serves as a flow retarder for substantially the entire screen 17. In the specific embodiment illustrated, the openings 25 occupy 8.1% of the available area of the rigid sheet forming the tubular member 24 and there are about 13 holes per square inch. In contrast, holes in screens 15 and 17 occupy 30% of the area and there are about 233 holes per square inch.

In the operation of the apparatus of this invention washing solution during the washing cycle containing entrained particles of food residue and other foreign materials flows to the bottom of the tub 11 and into the sump 13 by way of the screen 15 and tubular screen 17. Some of the entrained solids are retained by the preliminary separating screen 15 to be washed into center opening 16, and liquid through this screen flows directly into the sump portion 19 and into the receiver 20 surrounding the barrier member 24. From here the liquid flows to the pump 12 through the tubular conduit 22 in the recirculation path. Certain other portions of the liquid flow across the top surface of the screen 15 into the tubular screen 17 washing solid particles along with it. These are not separate streams of liquid, of course, as the entire sump 13 is substantially filled with liquid, but are actually separate currents of liquid.

The recirculation system including the pump 12 tends to cause liquid carrying solids to flow outwardly through the tubular screen 17 and the barrier member 24 on its way through the machine. Because the barrier member 24 acts as a pressure drop means, the fluid pressure drop across the openings in the screen 17 is relatively small. This lowers the radial velocity of the solid particles giving the solid particles more time to drop to the bottom section 23 of the rubber receiver 20. However, because the liquid being flowed through the screen 15 directly into the pump can bypass the tubular screen 17, there is no substantial restriction in total liquid flow. The only portion of the liquid where flow is retarded is that portion carrying the solid particles in the interior of the tubular screen 17.

During the preliminary rinse and washing cycles and to a certain extent during the rinsing cycle solids therefore are flushed over the top surface of the screen 15 into the interior of the tubular member 17. Here they are filtered from the portion of liquid within this tubular screen and either fall directly into the bottom section 23 or are held lightly in the inner extremities of the openings in the tubular screen 17. Then, during a terminal portion of the complete washing and rinsing cycle water is directed through the system except it is directed through the outlet conduit 21 instead of the recirculation conduit 22 so that solid particles are flushed from the inner surface of the tubular screen 17 and from the solids receiving bottom section 23 to a place of disposal such as the sewer through the outlet conduit 21.

As can be seen from the above description, the filtering apparatus of this invention operates by slowing down fluid flow through the final filter means by providing a pressure drop means so as to prevent or materially reduce the solid particles from being wedged in this filter means. However, fluid flow through the apparatus is not substantially interferred with as most of the fluid bypasses this final filter screen. This has resulted in over-all faster recirculation of the fluids in the dishwasher, thereby requiring lesser quantities of fluids.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Filtering apparatus comprising:
    means for containing a liquid carrying entrained solids;
    means defining a collecting space;
    means forming a first path for conducting liquid from said containing means to said space and having an inlet opening to said containing means and a preliminary filter across said inlet;
    means forming a second path for conducting liquid from said containing means to said space in parallel with said first path and having an inlet which opens to said containing means for receiving the liquid carrying entrained solids from the containing means including liquid flowed over said preliminary filter to wash solids filtered from the liquid flowed in said first path and collected on said filter into said second path means inlet, said second path means further including
        a secondary filter thereacross spaced from said second path means inlet and defining therebetween a filter chamber portion, and
        foraminous pressure drop means between said secondary filter and said collecting space for reducing the velocity of liquid flow through the secondary filter thereby to prevent excessive wedging of filtered solids into said secondary filter, said secondary filter means defining the smallest size openings in said second path thereby substantially precluding filtering by said pressure drop means; and
    means for selectively causing flow of liquid through said chamber over said filter to a drain outlet thereby to selectively wash the retained filtered solids from the secondary filter.

2. The filtering apparatus of claim 1 wherein said pressure drop means comprises a foraminous wall means having openings individually larger than the openings of said secondary filter means and cumulatively smaller in area than the total area of the opening of said secondary filter means.

3. The filtering apparatus of claim 1 further including a coarse screen across said second path inlet.

References Cited
UNITED STATES PATENTS

| | | | |
|---|---|---|---|
| 2,681,658 | 6/1954 | Meeker et al. | 134—111 |
| 2,927,451 | 3/1960 | Bochan | 210—409 X |
| 3,103,225 | 9/1963 | Schmitt-Matzen | 210—409 X |
| 3,109,809 | 11/1963 | Verrando | 210—338 |

REUBEN FRIEDMAN, *Primary Examiner.*

F. W. MEDLEY, *Assistant Examiner.*